(12) United States Patent
Benthien et al.

(10) Patent No.: US 9,382,017 B2
(45) Date of Patent: Jul. 5, 2016

(54) METHOD FOR REPAIRING AN AIRCRAFT STRUCTURE COMPONENT

(75) Inventors: Hermann Benthien, Sottrum (DE); Axel Soeffker, Sottrum (DE)

(73) Assignee: Airbus Operations GmbH (DE)

( * ) Notice: Subject to any disclaimer, the term of this patent is extended or adjusted under 35 U.S.C. 154(b) by 805 days.

(21) Appl. No.: 13/311,648

(22) Filed: Dec. 6, 2011

(65) Prior Publication Data

US 2012/0137484 A1 Jun. 7, 2012

Related U.S. Application Data

(60) Provisional application No. 61/419,989, filed on Dec. 6, 2010.

(30) Foreign Application Priority Data

Dec. 6, 2010 (DE) .......................... 10 2010 053 574

(51) Int. Cl.
*B64F 5/00* (2006.01)
*B29C 73/10* (2006.01)
*B29C 73/30* (2006.01)

(52) U.S. Cl.
CPC .............. *B64F 5/0081* (2013.01); *B29C 73/10* (2013.01); *B29C 73/30* (2013.01); *B29C 73/105* (2013.01); *Y10T 29/49723* (2015.01)

(58) Field of Classification Search
CPC ....... B64F 5/0081; B29C 73/04; B29C 73/06; B29C 73/08; B29C 73/10; B29C 73/12; B29C 73/24; B29C 73/245; B29C 73/26; B29C 73/105
USPC ............... 29/402.01, 402.09, 402.11, 402.12, 29/402.14, 402.18, 256, 258, 259, 261, 29/262

See application file for complete search history.

(56) References Cited

U.S. PATENT DOCUMENTS

| | | | | |
|---|---|---|---|---|
| 2,052,304 A | * | 8/1936 | Kaplan | 29/262 |
| 2,771,259 A | * | 11/1956 | Laystrom | 248/489 |
| 2,835,029 A | * | 5/1958 | Collins, Sr. | 29/261 |
| 2,971,254 A | * | 2/1961 | Fairfield | 29/261 |
| 3,661,683 A | * | 5/1972 | Engel et al. | 156/580 |
| 4,145,800 A | * | 3/1979 | Scholz et al. | 29/402.15 |
| 4,176,437 A | * | 12/1979 | Scholz et al. | 29/402.12 |
| 4,195,398 A | * | 4/1980 | Matthews | 29/262 |

(Continued)

FOREIGN PATENT DOCUMENTS

| | | |
|---|---|---|
| DE | 10 2004 001 078 A1 | 7/2005 |
| DE | 10 2007 062 111 A1 | 7/2009 |

*Primary Examiner* — Christopher M Koehler
(74) *Attorney, Agent, or Firm* — Barnes & Thornburg LLP

(57) ABSTRACT

A method is provided for repairing an aircraft structural component which has a component fault in a portion adjoining a cavity of the aircraft structural component. The method includes removing a region of the aircraft structural component that has the component fault, introducing a bearing element into the cavity of the aircraft structural component through an opening, which has been formed in the aircraft structural component by the removal of the region of the aircraft structural component having the component fault, in such a way that a bearing surface of the bearing element comes to lie against a region, adjacent to the opening, of an inner surface of the aircraft structural component facing the cavity of the aircraft structural component, fixing the bearing element in its position in the cavity of the aircraft structural component, and closing the opening by means of a repair material.

12 Claims, 12 Drawing Sheets

(56) References Cited

U.S. PATENT DOCUMENTS

| | | | |
|---|---|---|---|
| 4,274,189 A * | 6/1981 | Conover | 29/256 |
| 4,724,608 A * | 2/1988 | Parrott | 29/724 |
| 4,858,853 A * | 8/1989 | Westerman et al. | 244/119 |
| 4,961,799 A * | 10/1990 | Cologna et al. | 156/92 |
| 5,023,987 A * | 6/1991 | Wuepper et al. | 29/402.11 |
| 5,034,254 A * | 7/1991 | Cologna et al. | 428/63 |
| 5,058,519 A * | 10/1991 | Collins | 114/227 |
| 5,207,541 A * | 5/1993 | Westerman | B23Q 9/0014 409/132 |
| 5,271,145 A * | 12/1993 | Westerman et al. | 29/558 |
| 5,617,767 A * | 4/1997 | Nikoden | 81/488 |
| RE36,009 E * | 12/1998 | Shultz | 29/898.08 |
| 5,875,606 A * | 3/1999 | Jensen | 52/741.41 |
| 5,920,976 A * | 7/1999 | Grigory et al. | 29/402.09 |
| 5,927,223 A * | 7/1999 | Meyer | 114/227 |
| 5,944,466 A * | 8/1999 | Rudnicki et al. | 411/344 |
| 5,975,183 A * | 11/1999 | Reis et al. | 156/580 |
| 6,044,613 A * | 4/2000 | Crafts et al. | 52/741.1 |
| 6,158,110 A * | 12/2000 | Takacs | 29/724 |
| 6,174,392 B1 * | 1/2001 | Reis | B29C 73/06 156/58 |
| 6,203,260 B1 * | 3/2001 | Henline et al. | 411/340 |
| 6,317,952 B1 * | 11/2001 | Vogt | 29/402.09 |
| 6,656,299 B1 * | 12/2003 | Grosskrueger et al. | 156/98 |
| 6,877,198 B2 * | 4/2005 | Shevela | 29/264 |
| 7,226,261 B1 * | 6/2007 | Bristol | 411/342 |
| 7,513,024 B2 * | 4/2009 | Keller | B23P 6/04 29/402.09 |
| 8,356,580 B2 * | 1/2013 | Gelorme et al. | 122/13.01 |
| 8,356,649 B2 * | 1/2013 | Cacace et al. | 156/382 |
| 8,475,615 B2 * | 7/2013 | Deleris | B29C 73/10 156/250 |
| 2007/0050963 A1 * | 3/2007 | Keller | B23P 6/04 29/402.12 |
| 2008/0281554 A1 * | 11/2008 | Cork | B29C 73/06 702/150 |
| 2010/0314029 A1 * | 12/2010 | Lindgren | B23Q 17/20 156/98 |
| 2010/0316458 A1 * | 12/2010 | Lindgren | B29C 73/10 409/79 |
| 2011/0232829 A1 * | 9/2011 | Cacace et al. | 156/94 |

\* cited by examiner

METHOD FOR REPAIRING AN AIRCRAFT STRUCTURE COMPONENT

CROSS-REFERENCE TO RELATED APPLICATIONS

This application claims priority to, and the benefit of, German Patent Application No. 102010053574.5 and U.S. Provisional Patent Application No. 61/419,989 both filed Dec. 6, 2010, the disclosures of which are each incorporated herein by reference.

FIELD OF THE INVENTION

The invention relates to a method of repairing an aircraft structural component that is made in particular of a fibre-reinforced composite material.

BACKGROUND

In aircraft construction attempts are being made increasingly to use, as load-bearing components, components that are made entirely or partially from fibre-reinforced composite materials, for example carbon fibre-reinforced plastics (CFP). For example DE 10 2007 062 111 A1 describes a crossmember structure made of carbon fibre-reinforced plastics material, which is used to support the individual panels of an aircraft floor system for dividing a passenger cabin from a cargo compartment disposed underneath the passenger cabin. It is further known for example from DE 10 2004 001 078 A1 to provide aircraft fuselage segments with a skin of a sandwich structure and with reinforcing elements (for example frames, stringers) made of fibre-reinforced composite materials.

During the manufacture—represented in FIG. 1—of an aircraft structural component 10 in the form of an aircraft fuselage segment from a fibre-reinforced composite material, reinforcing fibre layers impregnated with synthetic resin are first brought into a desired shape of a surface portion 12, which forms an aircraft skin, and a reinforcing portion 14, which forms a frame or stringer. The surface portion 12 and the reinforcing portion 14 are then joined to one another "wet in wet", i.e. without prior curing of the synthetic resin forming a matrix of the fibre-reinforced composite material, in an autoclave. During the treatment in the autoclave a steel mould 16, which receives the surface portion 12 and the reinforcing portion 14, guarantees the dimensional stability of the external contours of the aircraft structural component 10. Furthermore, for additionally stabilizing the shape of the reinforcing portion 14 a tube 20 is introduced into a cavity 18 that is delimited by a region 12a of the surface portion 12 and by the reinforcing portion 14. The tube 20 is loaded with an internal pressure and therefore exerts a corresponding internal pressure on the region 12a of the surface portion 12 and the reinforcing portion 14 that delimit the cavity 18.

Particularly during the processing of composite materials having a matrix of a thermoset plastics material there is always the risk that during the curing process in the autoclave, which once started is no longer reversible, pores or stresses may arise in the matrix of the composite material and necessitate a secondary finishing and/or repair of the aircraft structural component 10. Particularly problematical, here, are component faults such as pores in a region of the aircraft structural component 10 adjoining the cavity 18, because repair of these component faults entails removing and then replacing the damaged component region.

SUMMARY

The invention is geared to the object of indicating a method of repairing an aircraft structural component that makes it possible, when replacing a removed component region adjoining a cavity of the aircraft structural component, to guarantee the required dimensional stability of the aircraft structural component in a comparatively simple and convenient manner.

This object is achieved by a method of repairing an aircraft structural component having the features of claim 1.

The method according to the invention is used to repair an aircraft structural component that has a component fault in a portion adjoining a cavity of the aircraft structural component. The aircraft structural component may be for example an aircraft fuselage segment that comprises a surface portion, which forms an aircraft skin, and a reinforcing portion, which forms a reinforcing element such as a frame or a stringer. The cavity of the aircraft structural component is then delimited by the reinforcing portion applied to the surface portion and by a region of the surface portion that is "bridged" by the reinforcing portion. The component fault to be repaired by means of the repair method according to the invention may be situated for example in the reinforcing portion or in the region of the surface portion that is "bridged" by the reinforcing portion.

The aircraft structural component that is to be repaired by means of the method according to the invention is made preferably of a fibre-reinforced plastics material, the matrix of which may, if need be, consist of a thermosetting or a thermoplastic polymer material. As reinforcing fibres, which may take the form of chopped strands or continuous strands, carbon fibres but also other suitable fibres, such as for example glass fibres, may be used. The fibres may be arranged unidirectionally or be present in the form of nonwoven or woven fabrics. Manufacture of the aircraft structural component that is to be repaired by means of the repair method according to the invention is effected preferably by means of an autoclave process, during which the polymer material forming the matrix of the fibre-reinforced composite material is cured. During the autoclave process, if need be, a plurality of individual components of the aircraft structural component, for example a surface portion and a reinforcing portion may be joined to one another "wet in wet". The component fault that is to be repaired by means of the repair method according to the invention may be pores. The method according to the invention may however also be used to repair other component faults, for example regions of the aircraft structural component deformed by stresses or the like.

In the method according to the invention of repairing an aircraft structural component, first the region of the aircraft structural component that has the component fault is removed. The region of the aircraft structural component having the component fault may be for example cut out of the aircraft structural component. It is self-evident that removal of the region of the aircraft structural component that has the component fault is effected preferably over an area that is as small as possible but of sufficient size that after the removal step only fault-free regions of the aircraft structural component remain. Removing the region of the aircraft structural component that has the component fault creates an opening that opens out into the cavity formed in the aircraft structural component.

In the next step a bearing element is introduced into the cavity of the aircraft structural component. Introduction of the bearing element into the cavity is effected through the opening created by removing the region of the aircraft structural component having the component fault in such a way that a bearing surface of the bearing element comes to lie against a region, adjacent to the opening, of an inner surface of the aircraft structural component facing the cavity of the aircraft structural component. In other words, the bearing element is such that, on the one hand, it may be introduced through the opening into the cavity of the aircraft structural component but, on the other hand, it has a bearing surface that may come to lie against a region, adjacent to the opening, of the inner surface of the aircraft structural component facing the cavity of the aircraft structural component in such a way that the bearing element is held in its position in the cavity of the aircraft structural component.

The bearing surface of the bearing element preferably surrounds the opening when the bearing element occupies the desired position in the cavity of the aircraft structural component. For example the bearing surface of the bearing element may lie against inner surfaces, facing the cavity, of a reinforcing portion or of a region of a surface portion that is "bridged" by the reinforcing portion.

Finally, the opening created by removing the region of the aircraft structural component that has the component fault is closed by means of a repair material. As a repair material, use is preferably made of a material that is also used to manufacture the aircraft structural component. Thus, if the aircraft structural component is a component made of a fibre-reinforced composite material, the opening is closed preferably also by means of a repair material consisting of a fibre-reinforced composite material.

The bearing surface of the bearing element may at least in sections be provided with a surface layer of the same material as the repair material. For example the bearing surface may comprise a surface layer of a fibre-reinforced composite material. The surface layer of the bearing element and the repair material may then be joined to one another, for example by curing a polymer material that forms a matrix of the fibre-reinforced composite material, in order to fix the bearing element in its position in the cavity of the aircraft structural component. When the bearing element is introduced into the cavity of the aircraft structural component, the polymer material forming a matrix of the fibre-reinforced composite material is therefore preferably not yet cured. Equally, when the repair material is introduced into the opening, the polymer material forming a matrix of the fibre-reinforced composite material is not yet cured.

In the repair method according to the invention the bearing element that has been introduced into the cavity of the aircraft structural component forms a "support" for the repair material used to close the opening. The bearing element therefore guarantees the dimensional stability of the aircraft structural component that is to be repaired, without there being any need to introduce the aircraft structural component into a mould. It is moreover possible to dispense with loading the cavity of the aircraft structural component with an internal pressure by means of a tube, which takes up a large volume of the cavity and consequently cannot be introduced into the cavity through the opening created by the removal of the region of the aircraft structural component that has the component fault. The repair method according to the invention is therefore simple and convenient to implement. The method moreover enables small-scale removal of the region of the aircraft structural component that has the component fault, i.e. regions of the aircraft structural component that lie adjacent to the region having the component fault are not damaged during implementation of the repair method according to the invention.

Preferably during closing of the opening by means of the repair material a pressure is exerted on an outer surface of the repair material that faces away from the cavity of the aircraft structural component. In this way, the dimensional stability of the aircraft structural component during replacement of the removed region of the aircraft structural component is guaranteed. The aircraft structural component in the area surrounding the opening may moreover be exposed to a raised temperature of for example ca. 125° C. during closing of the opening. A raised temperature enables easy and rapid curing of a hardenable polymer material that forms the matrix of a repair material consisting of a fibre-reinforced composite material.

In a preferred embodiment of the method according to the invention, during closing of the opening by means of the repair material the bearing element in its expanded state exerts a pressure on an inner surface of the repair material facing the cavity of the aircraft structural component. In other words, the bearing element preferably presses upon an inner surface of the repair material facing the cavity of the aircraft structural component, i.e. the bearing element in this way ensures that during replacement of the removed region the repair material assumes the desired shape. Also, if desired, a vacuum may be applied to the cavity of the aircraft structural component, i.e. the cavity of the aircraft structural component may be placed under a pressure that is below atmospheric pressure.

The pressure, which during closing of the opening by means of the repair material the bearing element exerts on the inner surface of the repair material facing the cavity of the aircraft structural component, preferably corresponds substantially to the pressure, which during closing of the opening by means of the repair material is exerted on the outer surface of the repair material that faces away from the cavity of the aircraft structural component. The exerting of a pressure on both sides of the repair material guarantees that the repair material used to close the opening assumes the desired shape.

In a first embodiment of the method according to the invention the bearing element may comprise an expansion anchor, which while being introduced through the opening into the cavity of the aircraft structural component is in a first non-expanded position and which is brought in the cavity of the aircraft structural component into a second expanded position, in which the bearing surface of the bearing element that is formed on the expansion anchor may be brought to lie against the region, adjacent to the opening, of the inner surface, facing the cavity of the aircraft structural component, of the region of the aircraft structural component having the component fault. An expansion anchor may be introduced into the cavity of the aircraft structural component even through an opening having a small cross section. It is therefore optionally possible to dispense with large-scale removal of a region of the aircraft structural component that has a component fault.

The expansion anchor is preferably brought from its first non-expanded position into its second expanded position in that two swivel elements each carrying a portion of the bearing surface are pivoted relative to one another about a swiveling axis.

In a second embodiment of the method according to the invention the bearing element may comprise a helical body that is screwed through the opening into the cavity of the aircraft structural component until the bearing surface of the bearing element that is formed on the helical body comes to lie against the region, adjacent to the opening, of the inner surface of the aircraft structural component that faces the cavity of the aircraft structural component. Here, by a "helical body" is meant a component that comprises a structure extending helically or helicoidally around an opening. This configuration of the bearing element makes use of the fact that a helical body may be screwed into the cavity of the aircraft structural component through an opening, the cross section of which is smaller than a diameter of the helical body.

An opening formed in the helical body in the region of a centre line of the helical body is preferably sealed by means of a sealing sleeve. The sealing sleeve therefore creates a through bearing surface.

The bearing element may be introduced through the opening into the cavity of the aircraft structural component by means of a threaded rod. For example the threaded rod may be connected to the bearing element by means of a corresponding internal thread of the bearing element. Such a development is recommended in the case of a bearing element comprising an expansion anchor because an expansion anchor connected by an internal thread to the threaded rod may also be rotated relative to the threaded rod without difficulty, should such a rotation of the expansion anchor prove necessary in the course of mounting the expansion anchor in the cavity of the aircraft structural component. In the case of a bearing element comprising a helical body, the threaded rod may extend through the sealing sleeve, which closes the opening formed in the helical body in the region of a centre line of the helical body, and be fixed by means of a nut.

The bearing element may be braced in its position in the cavity of the aircraft structural component by means of a clamping device that is connected to the threaded rod. As a clamping device, it is possible to use for example a clamping strut. If desired, the clamping device may also be used during closing of the opening by means of the repair material to exert a pressure on an outer surface of the repair material that faces away from the cavity of the aircraft structural component.

After closing of the opening by means of a repair material, the threaded rod is preferably removed from the bearing element. Then a receiving opening that is provided in the repair material for receiving the threaded rod is closed by means of a suitable closure element.

The closure element may be configured in the form of a countersunk bolt. Preferably, before introducing the closure element into the receiving opening provided in the repair material for receiving the threaded rod, a countersink is then introduced into the repair material. The countersunk bolt may additionally be glued in order to guarantee a secure fixing of the bolt in the receiving opening.

After closing of the opening by means of the repair material and sealing of any threaded-rod receiving opening the bearing element remains in its position in the cavity of the aircraft structural component. As the bearing element has a low weight, it adds only insignificantly to the weight of the aircraft structural component. A particularly secure fixing of the bearing element in the cavity of the aircraft structural component is guaranteed if the bearing element is, as mentioned above, provided with a surface layer that may be joined by means of a "wet-in-wet" curing process to the repair material in order to close the opening.

The region of the aircraft structural component that has the component fault is removed preferably in steps, wherein a cross section of the opening formed in the aircraft structural component by removal of the region of the aircraft structural component having the component fault preferably increases stepwise from an inner surface of the aircraft structural component that adjoins the cavity of the aircraft structural component in the direction of an outer surface of the aircraft structural component that faces away from the cavity of the aircraft structural component.

The opening is preferably closed by means of a plurality of superimposed repair material layers. If the repair material layers are repair material layers of a fibre-reinforced composite material, the repair material layers are introduced into the opening preferably "wet in wet", i.e. without prior curing of the polymer material that forms a matrix of the fibre-reinforced composite material. In one step the repair material layers are then cured and joined to one another as well as to the aircraft structural component.

If the region of the aircraft structural component that has the component fault is removed in steps, an inner repair material layer adjoining the cavity of the aircraft structural component preferably has a smaller area than an outer repair material layer that faces away from the cavity of the aircraft structural component. In other words, the opening is closed preferably by means of a tapered overlap of a plurality of repair material layers.

BRIEF DESCRIPTION OF DRAWINGS

There now follows a detailed description of preferred embodiments of the invention with reference to the accompanying diagrammatic drawings, which show FIG. 1 the manufacture of an aircraft structural component configured in the form of an aircraft fuselage segment from a fibre-reinforced composite material, FIG. 2 an aircraft structural component configured in the form of an aircraft fuselage segment, which has a component fault in a region adjoining a cavity of the aircraft structural component, FIG. 3 the aircraft structural component according to FIG. 2, wherein however the region of the aircraft structural component having the component fault has been removed, thereby forming in the aircraft structural component an opening that opens out into the cavity of the aircraft structural component, FIG. 4 the aircraft structural component according to FIG. 3, wherein however a first embodiment of a bearing element, which is situated in a first position, has been introduced by means of a threaded rod through the opening into the cavity of the aircraft structural component, FIG. 5 the aircraft structural component according to FIG. 4, wherein however the bearing element has been rotated through 90° relative to the threaded rod, FIG. 6 the aircraft structural component according to FIG. 5, wherein however the bearing element has been transferred into a second position and braced in its position by means of a clamping device, FIG. 7 the aircraft structural component according to FIG. 6, wherein however the opening has been closed by means of a repair material, FIG. 8 the aircraft structural component according to FIG. 7, wherein however the threaded rod has been removed from the bearing element and a receiving opening provided in the repair material for receiving the threaded rod has been closed by means of a suitable closure element, FIG. 9 the mounting of a second embodiment of a bearing element through an opening in a cavity of the aircraft structural component, FIG. 10 the bearing element according to FIG. 9 in its final position in the cavity of the aircraft structural component, wherein the bearing element has been braced in its position by means of a clamping device, FIG. 11 the arrangement according to FIG. 10, wherein however the opening has been closed by means of a repair material, and FIG. 12 the arrangement according to FIG. 11, wherein however the threaded rod has been removed from the bearing element and a receiving opening provided in the repair material for receiving the threaded rod has been closed by means of a suitable closure element.

DESCRIPTION OF THE ILLUSTRATIVE EMBODIMENTS

Figure 1:
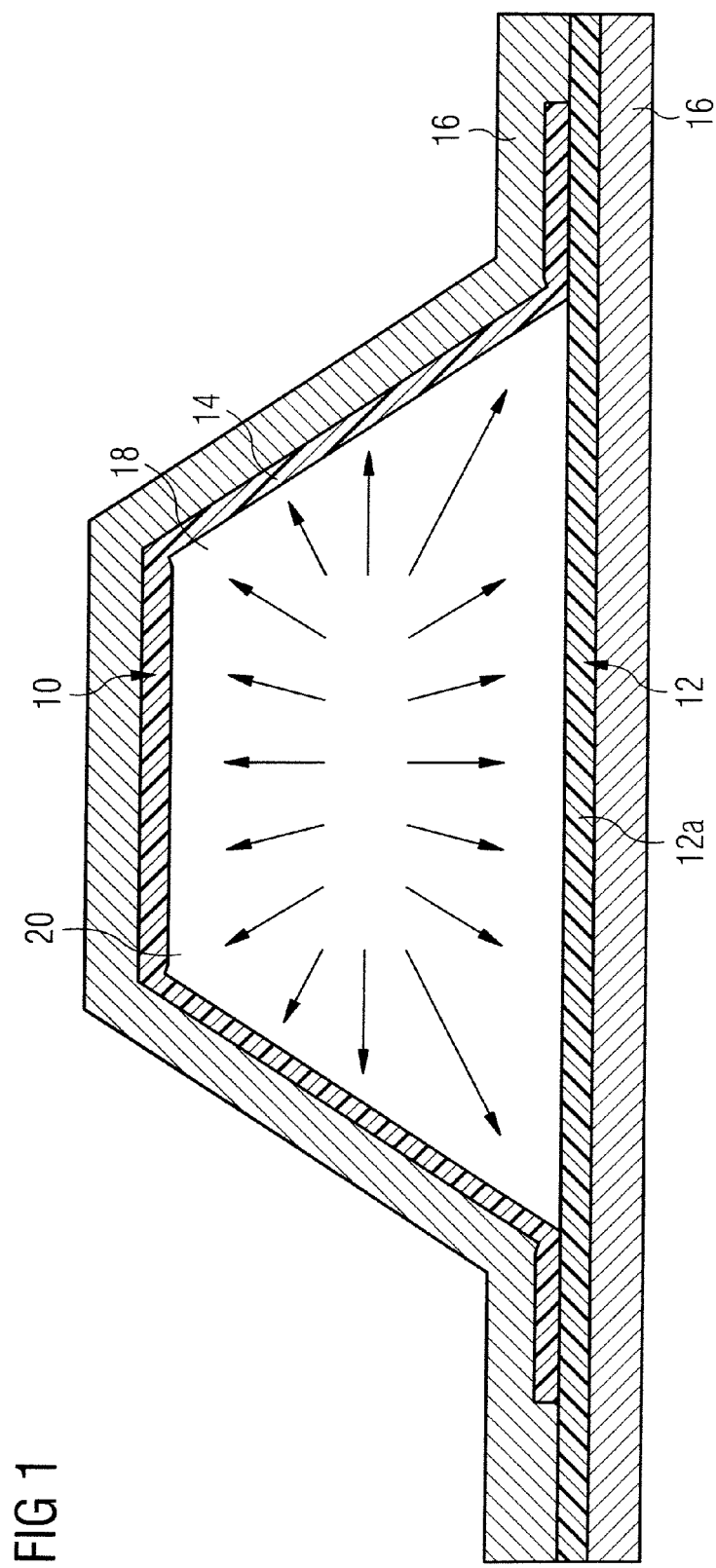
Figure 2:
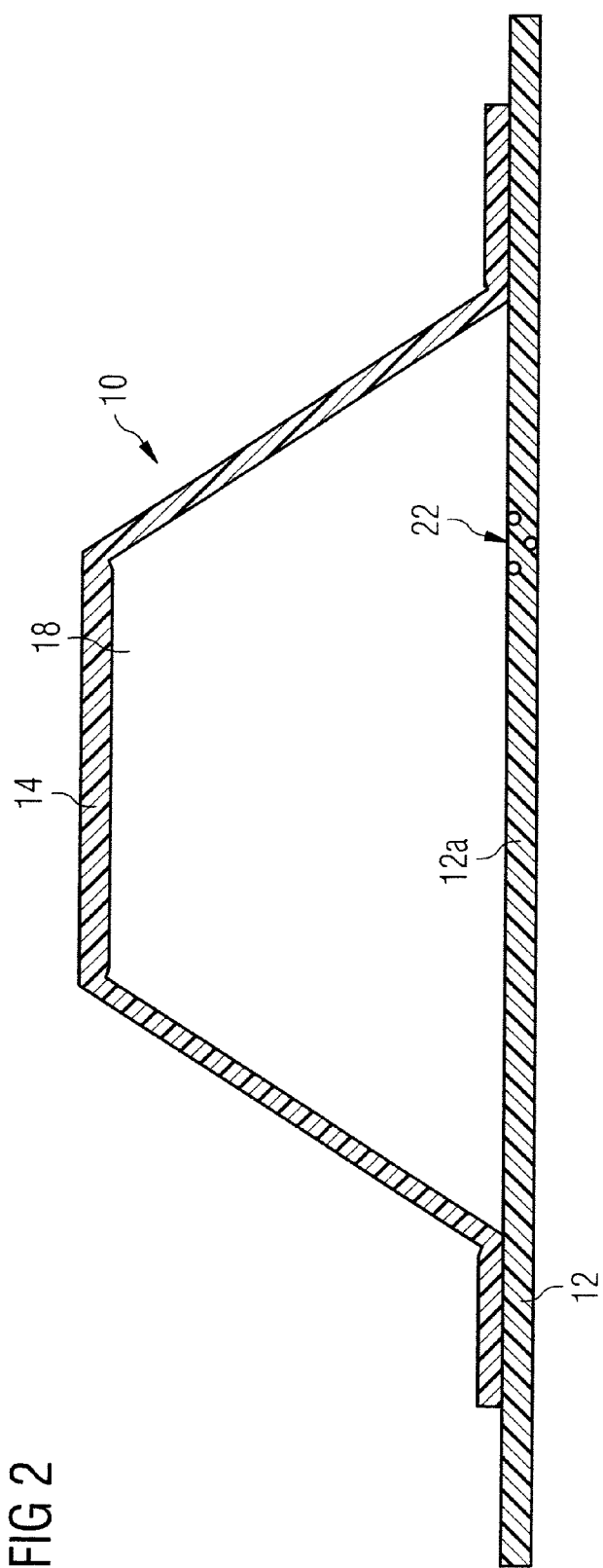

FIG. 2 shows an aircraft structural component 10 configured in the form of an aircraft fuselage segment, which is made of a fibre-reinforced composite material and has been manufactured in accordance with the method shown in FIG. 1, i.e. by "wet-in-wet" joining of a surface portion 12 and a reinforcing portion 14 that forms a frame or stringer and subsequent curing in an autoclave. The reinforcing portion 14 together with a region 12a of the surface portion 12 that is "bridged" by the reinforcing portion 14 delimits a cavity 18. In the region 12a of the surface portion 12 the aircraft structural component 10 has a component fault 22 formed by pores. Owing to the high stability under load that is required of aircraft structural components, the aircraft structural component 10 has to be repaired in the region of the component fault 22.

Figure 3:
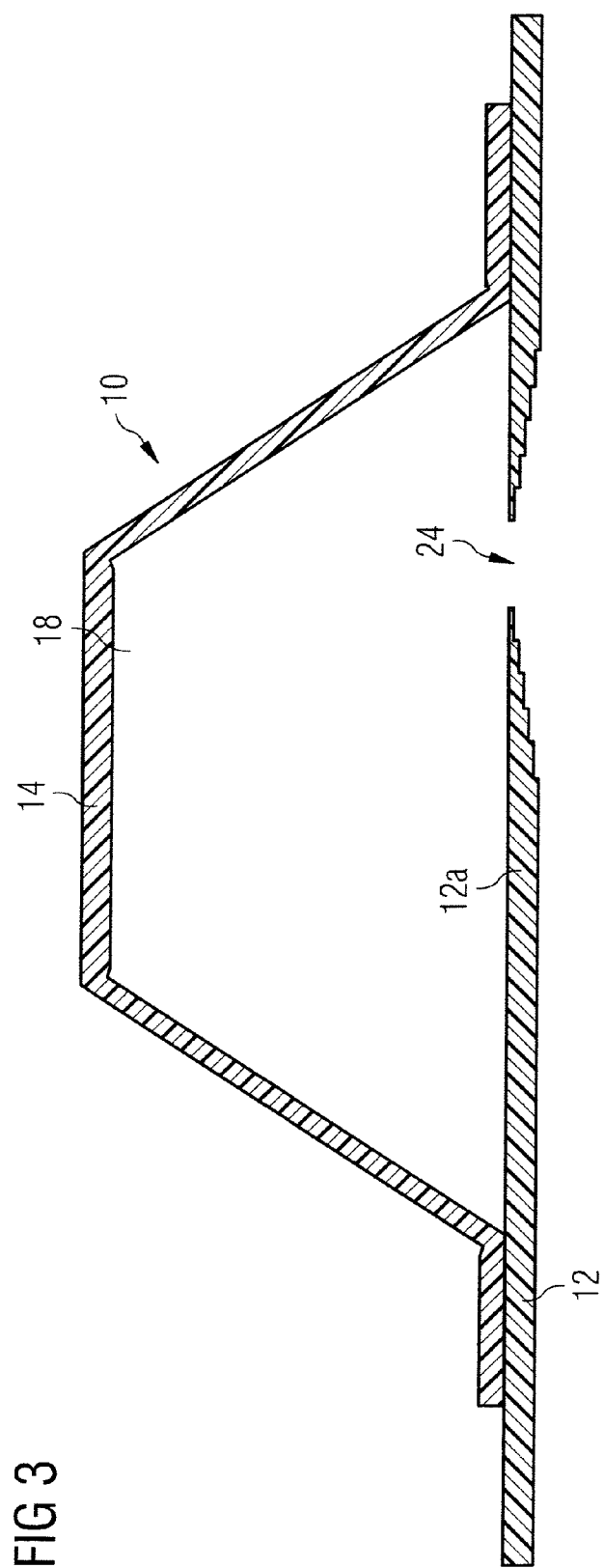

For this purpose, as is shown in FIG. 3, a region of the aircraft structural component 10 that has the component fault 22 first has to be removed in such a way that regions of the aircraft structural component that impair the mechanical properties of the aircraft structural component 10 are fully removed. Removal of the region of the aircraft structural component 10 that has the component fault 22 is effected in steps in such a way that an opening 24 that is formed as a result of removing the region in the aircraft structural component 10, i.e. in the region 12a of the surface portion 12 adjoining the cavity 18, has a smaller cross section in the region of an inner surface of the region 12a of the surface portion 12 that adjoins the cavity 18 than in the region of an outer surface of the region 12a of the surface portion 12 that faces away from the cavity 18.

Figure 4:
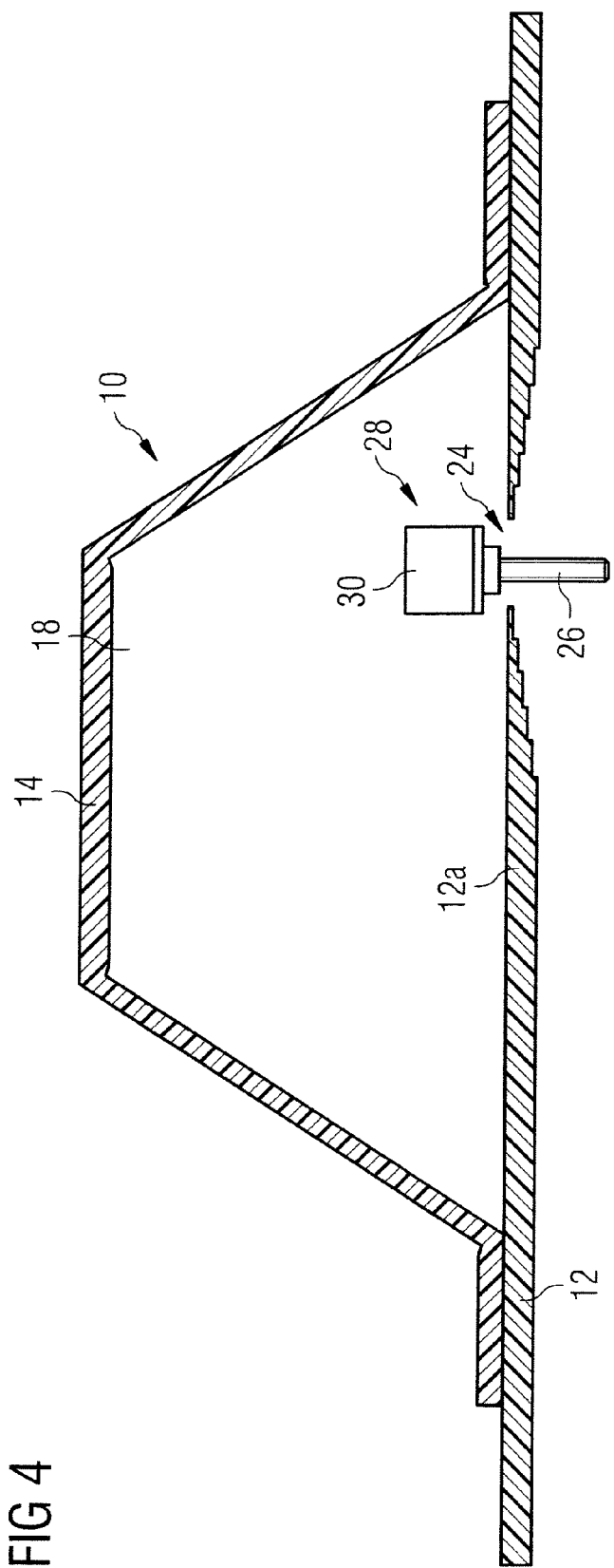

In the next step in a first embodiment of the method of repairing the aircraft structural component 10, as is shown in FIG. 4, a bearing element 28, which is connected to a threaded rod 26, is introduced through the opening 24 into the cavity 18 of the aircraft structural component 10. The bearing element 28 comprises an expansion anchor 30, which while being introduced through the opening 24 into the cavity 18 of the aircraft structural component 10 is in a first non-expanded position. After being introduced through the opening 24 into the cavity 18 of the aircraft structural component 10 the expansion anchor 30 is rotated through 90° relative to the threaded rod 26 until the expansion anchor 30 occupies the position shown in FIG. 5.

Figure 5:
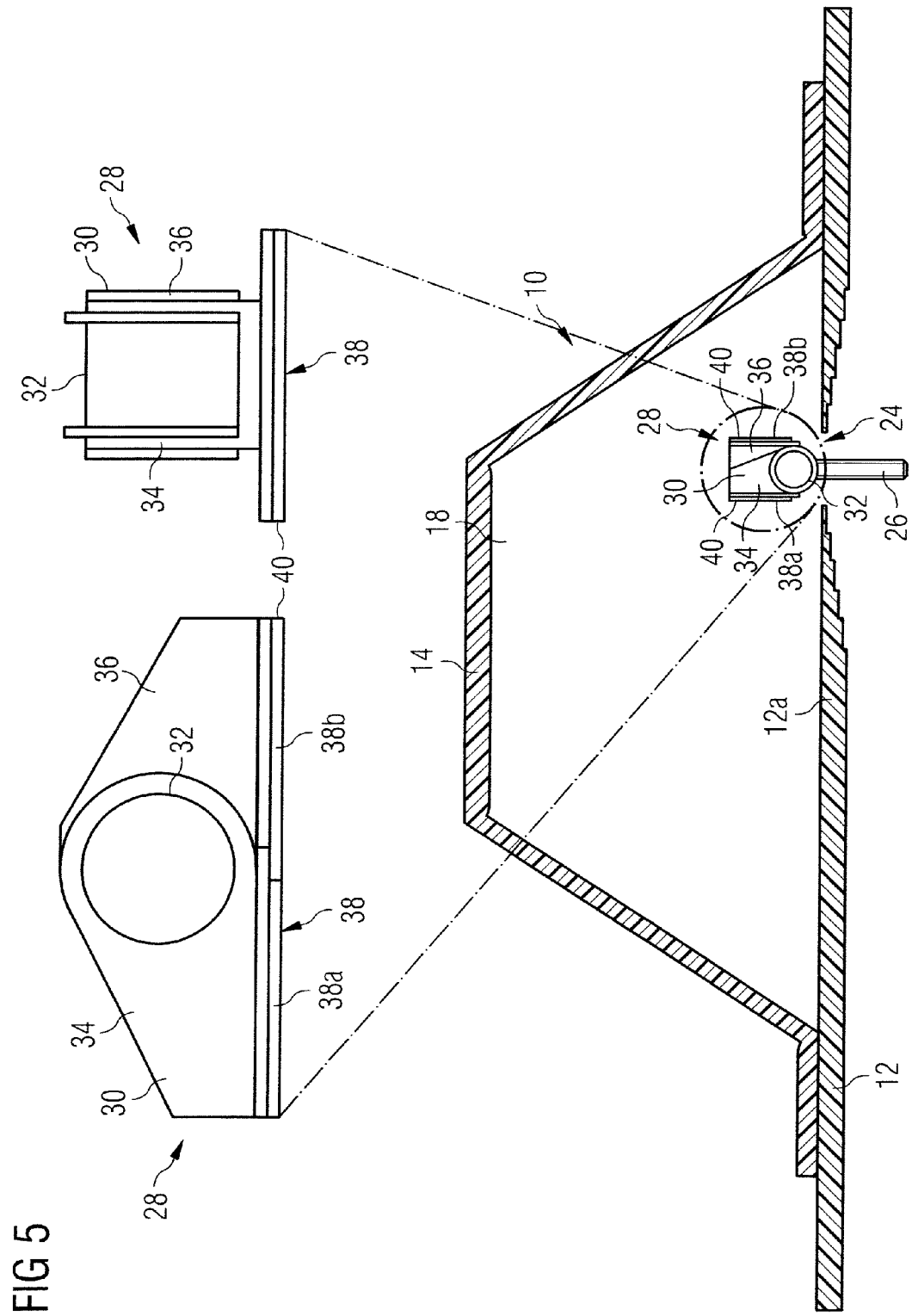

As may best be seen from FIG. 5, the expansion anchor 30 comprises two swivel elements 34, 36 that are pivotable relative to one another about a swiveling axis 32. The swivel elements 34, 36 and the swiveling axis 32 are made of a fibre-reinforced composite material or sheet titanium. Each of the swivel elements 34, 36 carries a portion 38a, 38b of a bearing surface 38 (see, in particular, the detail representation in FIG. 5). The bearing surface portions 38a, 38b are each provided with a surface layer 40 of reinforcing fibres, for example, carbon fibres, which are impregnated with a synthetic resin.

Figure 6:
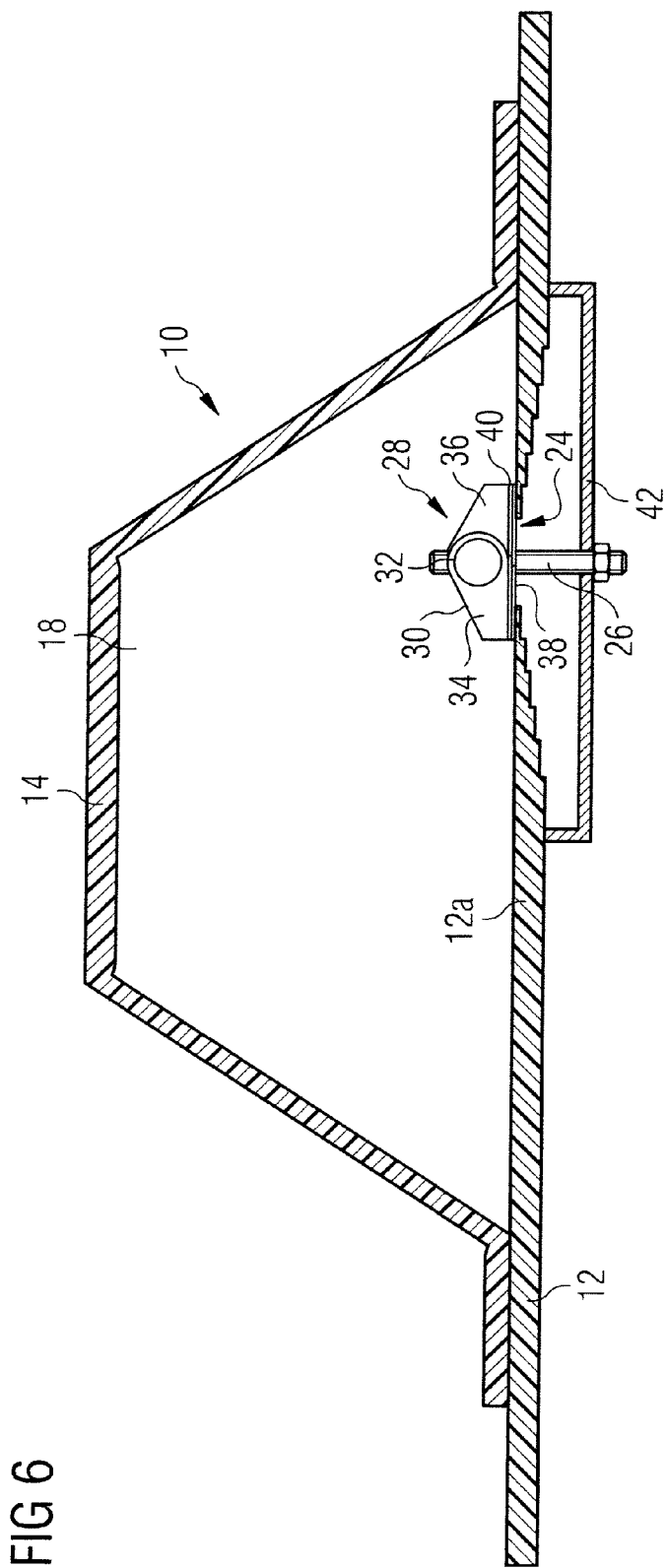

In order to bring the bearing surface 38 to lie against a region, adjacent to the opening 24, of the inner surface of the aircraft structural component 10 facing the cavity 18 of the aircraft structural component 10, the swivel elements 34, 36 are pivoted relative to one another about the swiveling axis 32 until they occupy the position shown in FIG. 6. The bearing element 28 is then braced in its position in the cavity 18 of the aircraft structural component 10 by means of a clamping device 42, which is connected to the threaded rod 26 and configured in the form of a clamping strut.

Figure 7:
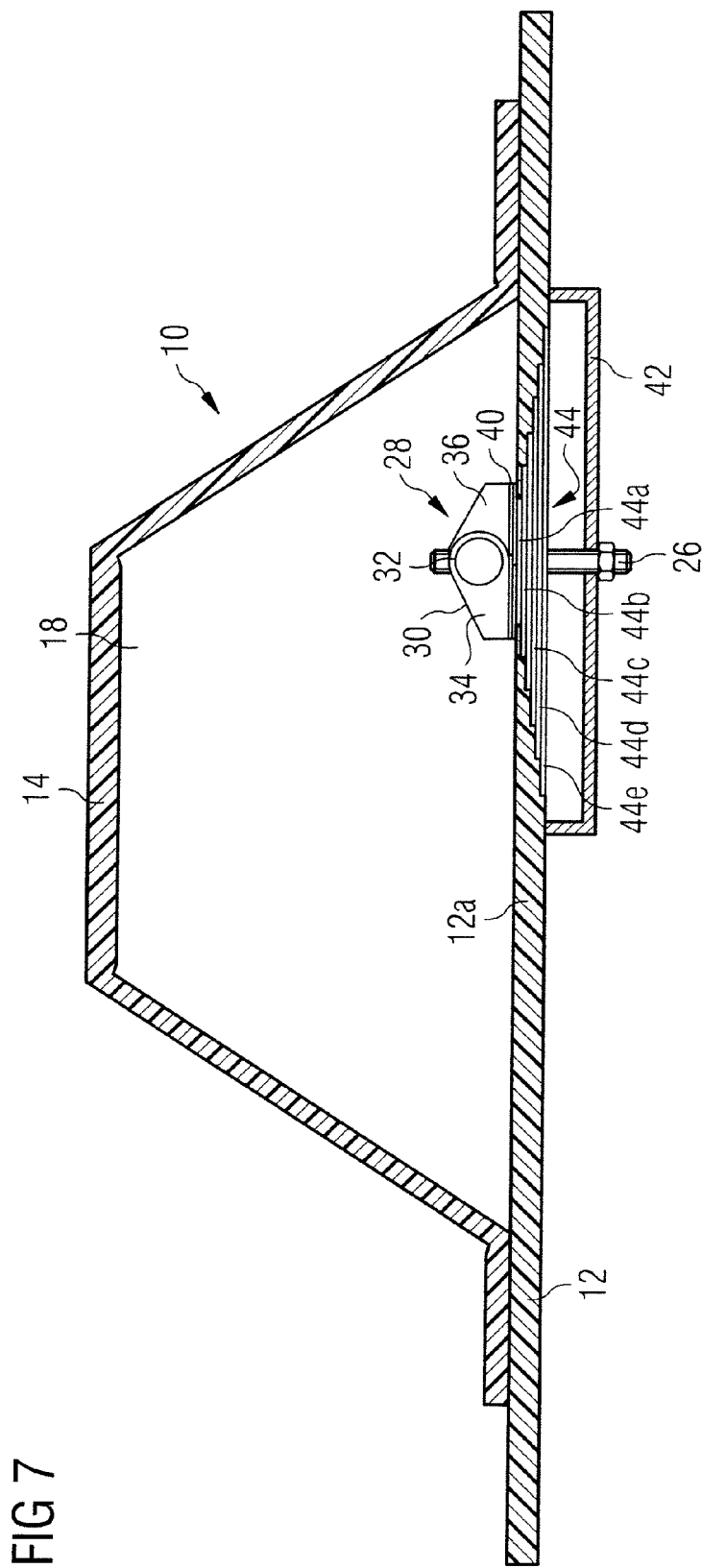

Finally, the opening 24 is closed by means of a repair material 44. As is shown in FIG. 7, the repair material 44 is introduced in a plurality of superimposed repair material layers 44a to 44e, i.e. in the form of a tapered overlap, into the region of the aircraft structural component 10 that was removed in steps. The dimensions of the repair material layers 44a to 44e are adapted in each case to the shape of the steps in the removed region of the aircraft structural component 10, i.e. an inner repair material layer 44a that adjoins the cavity 18 of the aircraft structural component 10 has a smaller area than an outer repair material layer 44e that faces away from the cavity 18 of the aircraft structural component 10.

The repair material layers 44a to 44e are made of the same material as the surface portion 12 and the reinforcing region 14, i.e. of a fibre-reinforced composite material. During the introduction of the repair material layers 44a to 44e into the opening 24 the polymer material forming the matrix of the fibre-reinforced composite material is not yet cured, i.e. the repair material layers 44a to 44e are introduced "wet in wet" into the removed region of the aircraft structural component 10.

In order to join the repair material layers 44a to 44e to one another as well as to the surface portion 12 of the aircraft fuselage segment 10, in a next step the curing of the repair material layers 44a to 44e is effected. For this purpose, a pressure $p_2$ is exerted on an outer surface of the surface portion 12, and hence of the repair material 44, that faces away from the cavity 18 of the aircraft structural component 10, which pressure $p_2$ counteracts a pressure $p_1$ that is exerted by the bearing element 28 on an inner surface of the surface portion 12, and hence of the repair material 44, that faces the cavity 18 of the aircraft structural component 10. A particularly high dimensional stability of the repair material 44 is achievable if the pressure $p_1$ exerted by the bearing element 28 corresponds in value approximately to the pressure $p_2$ that is exerted on the outer surface of the repair material 44 that faces away from the cavity 18 of the aircraft structural component 10. At the same time, the curing of the surface layer 40 provided on the bearing surface 38 of the bearing element 28 is effected, with the result that the bearing element 28 is joined to the repair material 44 as well as to the region of the surface portion 12 of the aircraft structural component 10 that surrounds the opening 24.

Figure 8:
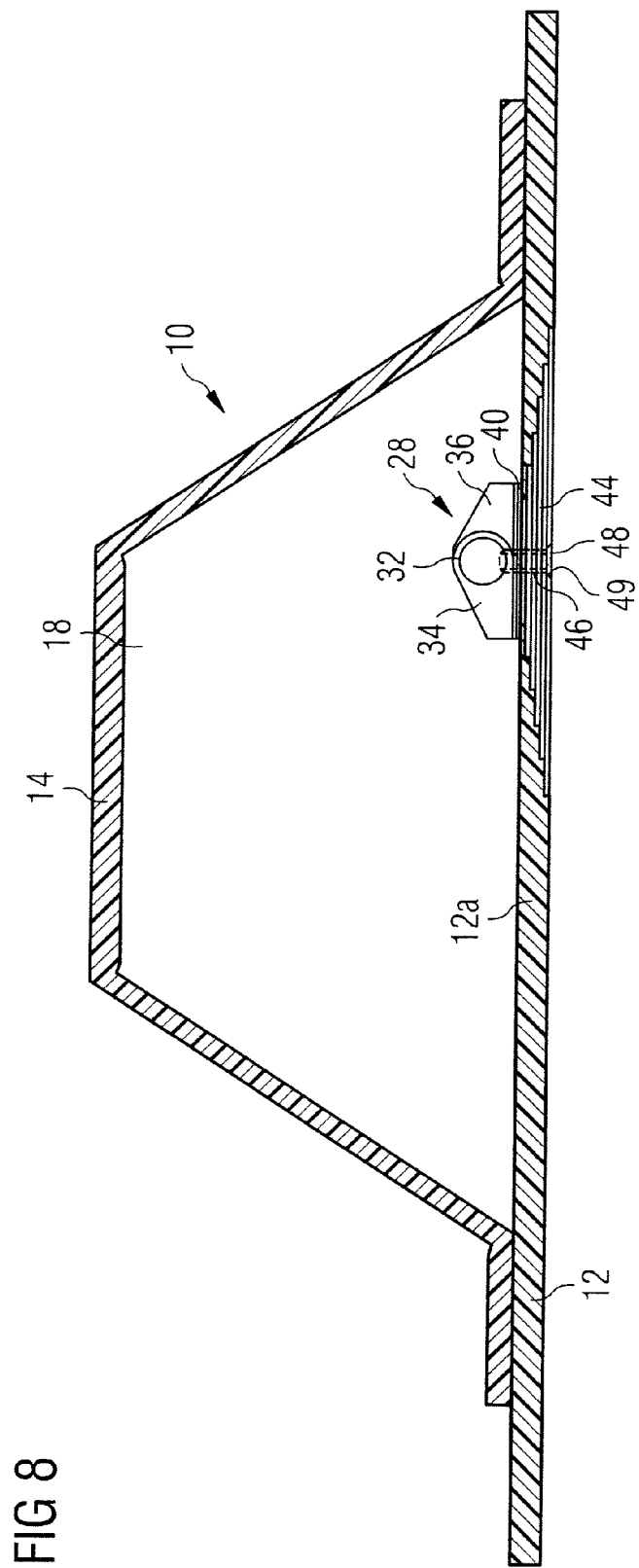
Figure 9:
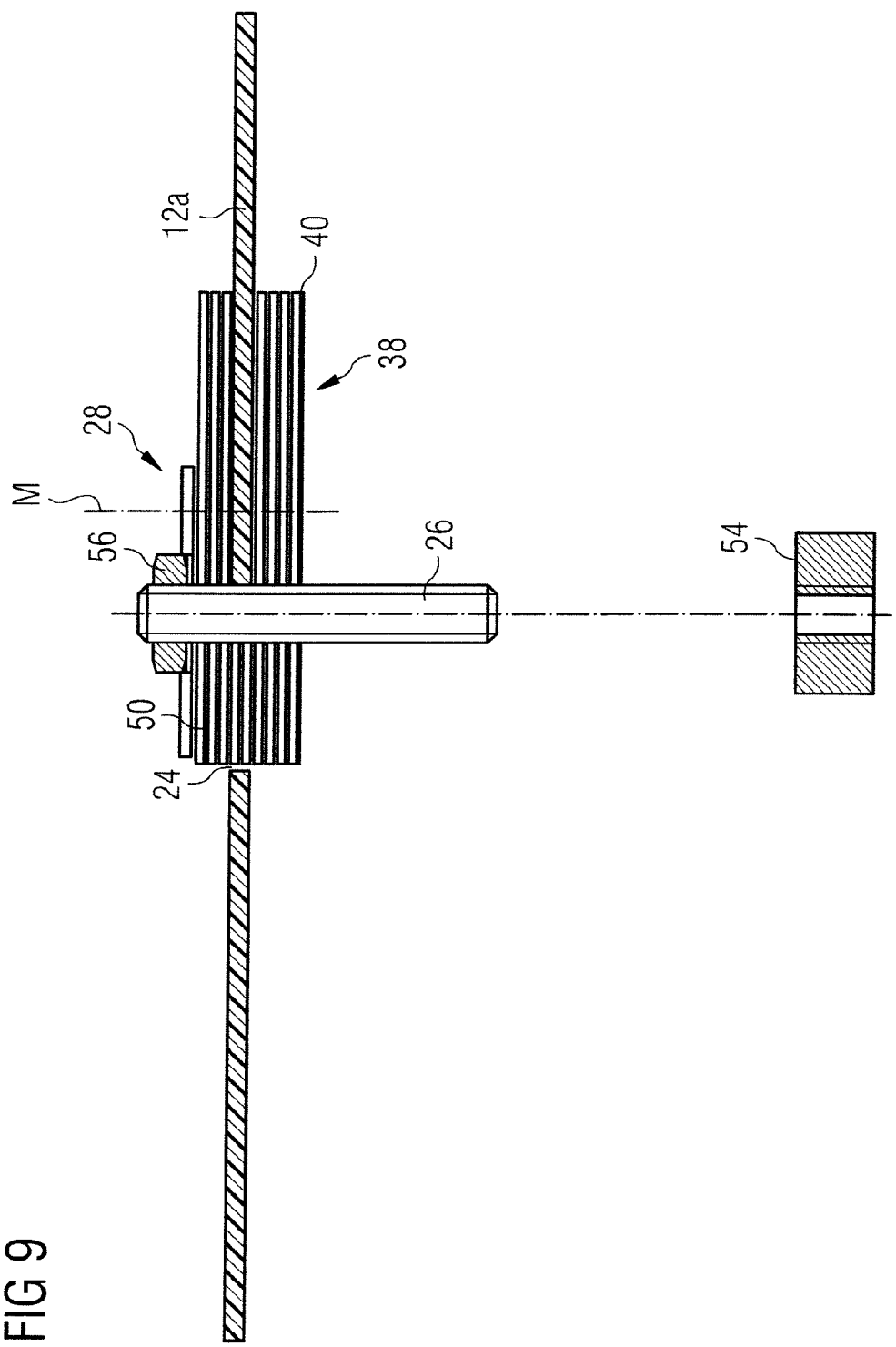
Figure 10:
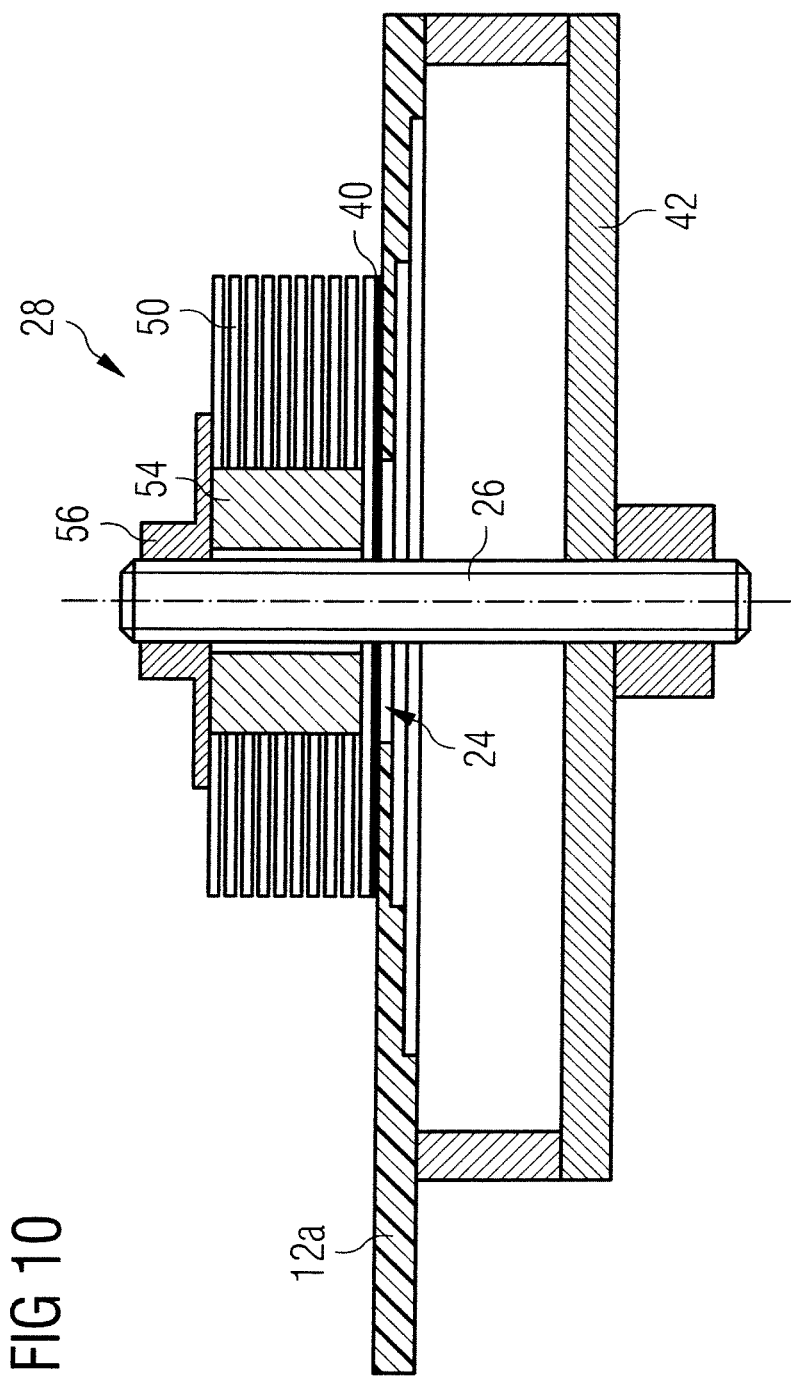
Figure 11:
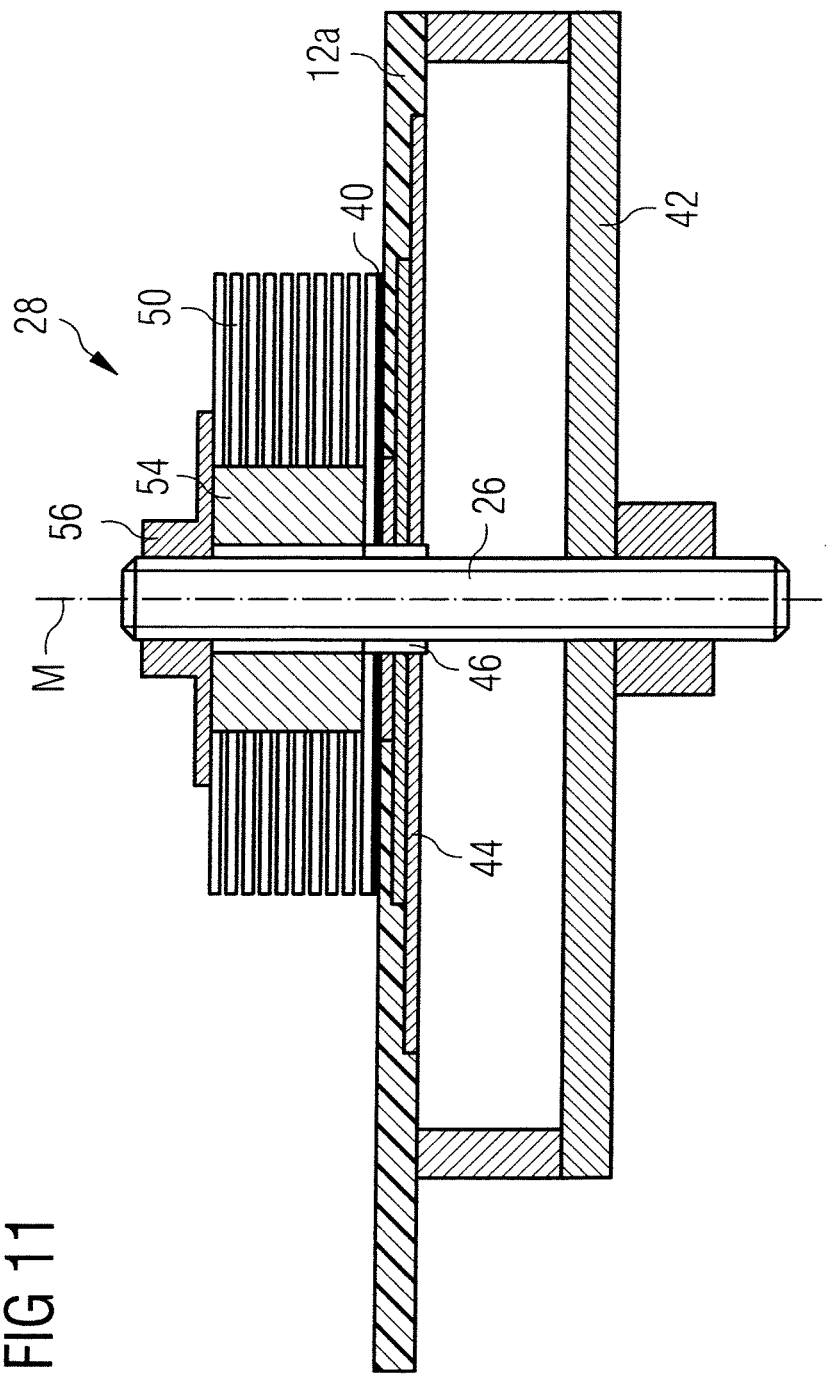
Figure 12:
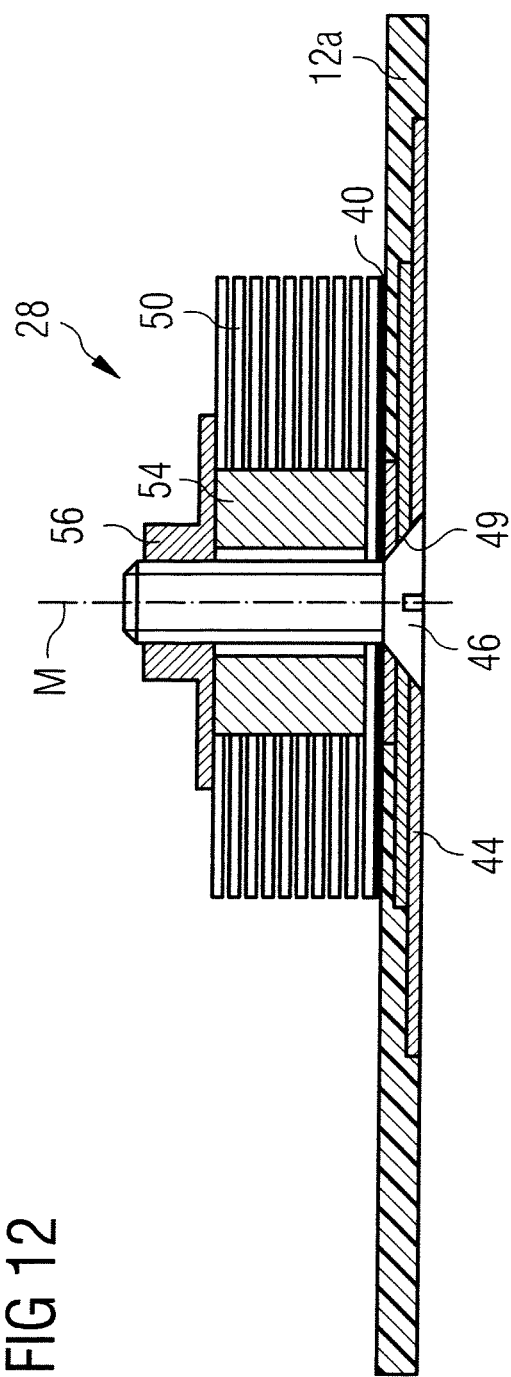

In the presently described method of repairing an aircraft structural component 10, bearing element 28 therefore acts as a support for the pressure $p_2$ that is to be exerted during curing of the repair material 44 on the outer surface of the repair material 44 that faces away from the cavity 18 of the aircraft structural component 10. After closing of the opening 24 by means of the repair material 44, the bearing element 28 remains where it is. Owing to the low weight of the bearing element 28, however, this is not disadvantageous. The threaded rod 26 and the clamping device 42 however are removed from the bearing element 28, see FIG. 8. Then a receiving opening 46, which is provided in the repair material 44 for receiving the threaded rod 26, is additionally closed by means of a suitable closure element 48. The closure element 48 is configured in the form of a countersunk bolt. For this reason, before introducing the closure element 48 into the receiving opening 46 a countersink 49 is introduced into the repair material 44. The countersunk bolt may additionally be glued in order to guarantee a secure fixing of the bolt in the receiving opening 46.

In a second embodiment of a method, shown in FIGS. 9 to 12, of repairing an aircraft structural component 10 use is made of a bearing element 28 having a helical body 50, which is screwed through the opening 24 into the cavity 18 of the aircraft structural component 10 until a bearing surface 38 formed on the helical body 50 of the bearing element 28 comes to lie against the region, adjacent to the opening 24, of the inner surface of the aircraft structural component 10 facing the cavity 18 of the aircraft structural component 10. This configuration of the bearing element 28 makes use of the fact that a helical body 50 may be screwed into the cavity 18 of the aircraft structural component 10 through an opening 24, the cross section of which is smaller than a diameter of the helical body 50.

An opening 52 formed in the helical body 50 in the region of a centre line M of the helical body 50 is sealed by means of a sealing sleeve 54 in order to create a through bearing surface 38. The bearing surface 38 is similarly provided with a surface layer 40 of reinforcing fibres impregnated with a synthetic resin in order, during curing of the repair material 44 that closes the opening and of the surface layer 40, to join the bearing element 28 securely to the aircraft structural component 10. The threaded rod 26 carrying the bearing element 28 extends through the sealing sleeve 54 and is fixed by means of a nut 56.

Given the use of a bearing element 28 having a helical body 50, after curing of the repair material 44 the threaded rod 26 and the clamping device are moreover also removed from the bearing element 28. Then the receiving opening 46 that is provided in the repair material 44 for receiving the threaded rod 26 is additionally closed by means of a suitable closure element 48 configured in the form of a countersunk bolt. The closure element 48 extends also through the sealing sleeve 54 and may be screw-fastened to the nut 56. Otherwise, the sequence of the repair method shown in FIGS. 9 to 12 corresponds to the repair method according to FIGS. 2 to 8.

The invention claimed is:

1. A method of repairing an aircraft structural component, which has a component fault in a portion adjoining a cavity of the aircraft structural component, wherein the method comprises the following steps:
   removing a region of the aircraft structural component that has the component fault,
   introducing a bearing element into the cavity of the aircraft structural component through an opening, which has been formed in the aircraft structural component by the removal of the region of the aircraft structural component that has the component fault, in such a way that a bearing surface of the bearing element comes to lie against a region, adjacent to the opening, of an inner surface of the aircraft structural component facing the cavity of the aircraft structural component,
   fixing the bearing element in its position in the cavity of the aircraft structural component, and
   closing the opening by means of a repair material,
   wherein bearing element comprises an expansion anchor, which while being introduced through the opening into the cavity of the aircraft structural component is in a first non-expanded position and which in the cavity of the aircraft structural component is brought into a second expanded position, in which the bearing surface formed on the expansion anchor of the bearing element may be brought to lie against the region, adjacent to the opening, of the inner surface of the aircraft structural component facing the cavity of the aircraft structural component,
   and wherein the expansion anchor comprises two swivel elements pivotable relative to one another about a swiveling axis and each carrying a portion of the bearing surface, the expansion anchor brought from its first non-expanded position into its second expanded position by pivoting the two swivel elements relative to one another about the swiveling axis,
   and wherein the region of the aircraft structural component that has the component fault is removed in steps such that a cross-section of the opening formed in the aircraft structural component by removal of the region of the aircraft structural component having the component fault increases stepwise from an inner surface of the aircraft structural component that adjoins the cavity of the aircraft structural component in the direction of an outer surface of the aircraft structural component that faces away from the cavity of the aircraft structural component,
   and wherein the bearing surface is at least in sections provided with a surface layer of the same material as the repair material, and the repair material is joined through the opening to the surface layer.

2. The method according to claim 1, wherein during closing of the opening by means of the repair material a pressure is exerted on an outer surface of the repair material that faces away from the cavity of the aircraft structural component.

3. The method according to claim 1, wherein the bearing element, in its state of being fixed in its position in the cavity of the aircraft structural component, during closing of the opening by means of the repair material exerts a pressure on an inner surface of the repair material that faces the cavity of the aircraft structural component.

4. The method according to claim 3, wherein the pressure, which during closing of the opening by means of the repair material the bearing element in its state of being fixed in its position in the cavity of the aircraft structural component exerts on the inner surface of the repair material facing the cavity of the aircraft structural component, corresponds substantially to the pressure, which during closing of the opening by means of the repair material is exerted on the outer surface of the repair material that faces away from the cavity of the aircraft structural component.

5. The method according to claim 1, wherein the bearing element comprises a helical body that is screwed through the opening into the cavity of the aircraft structural component until the bearing surface formed on the helical body of the bearing element comes to lie against the region, adjacent to the opening, of the inner surface of the aircraft structural component facing the cavity of the aircraft structural component.

6. The method according to claim 5, wherein an opening formed in the helical body in the region of a centre line of the helical body is sealed by means of a sealing sleeve.

7. The method according to claim 1, wherein the bearing element is introduced by means of a threaded rod through the opening into the cavity of the aircraft structural component, wherein the threaded rod during the introduction of the bearing element into the cavity of the aircraft structural component projects through the opening into the cavity of the aircraft structural component.

8. The method according to claim 7, wherein the bearing element is braced in its position in the cavity of the aircraft structural component by means of a clamping device that is connected to the threaded rod.

9. The method according to claim 7, wherein after closing of the opening by means of the repair material the threaded rod is removed from the bearing element and that a receiving opening provided in the repair material for receiving the threaded rod is closed by means of a suitable closure element.

10. The method according to claim 9, wherein the closure element is configured in the form of a countersunk bolt and that before introducing the closure element into the receiving opening provided in the repair material for receiving the threaded rod a countersink is introduced into the repair material.

11. The method according to claim 1, wherein the opening is closed by means of a plurality of superimposed repair material layers.

12. The method according to claim 11, wherein an inner repair material layer that adjoins the cavity of the aircraft structural component has a smaller area than an outer repair material layer that faces away from the cavity of the aircraft structural component.

\* \* \* \* \*